2 Sheets—Sheet 1.
H. A. KIMBALL.
Lathe for Manufacturing Buttons.
No. 218,985. Patented Aug. 26, 1879.
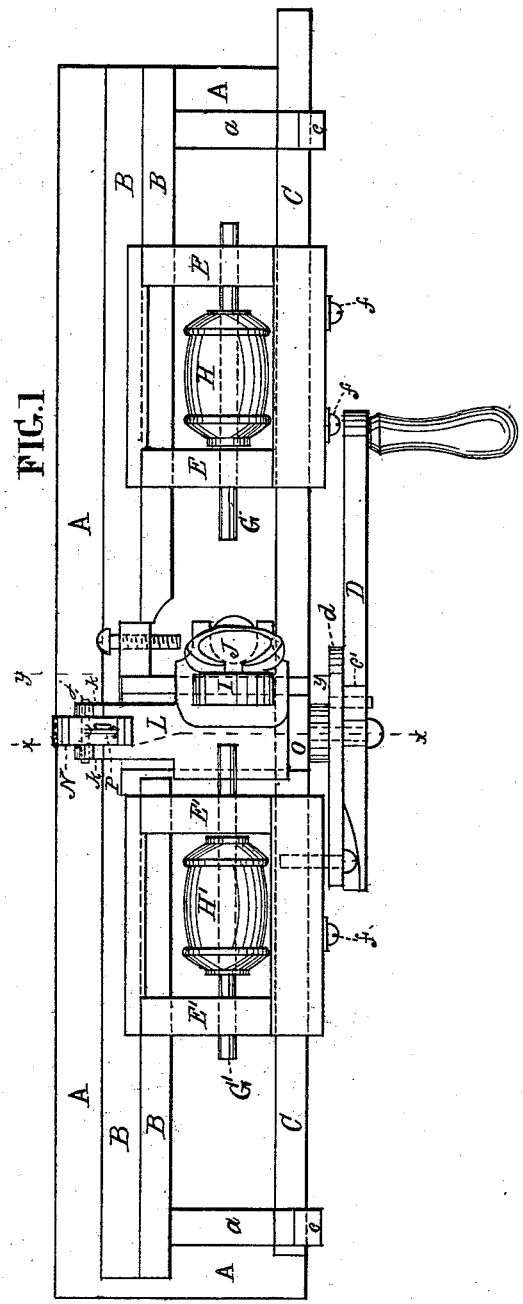
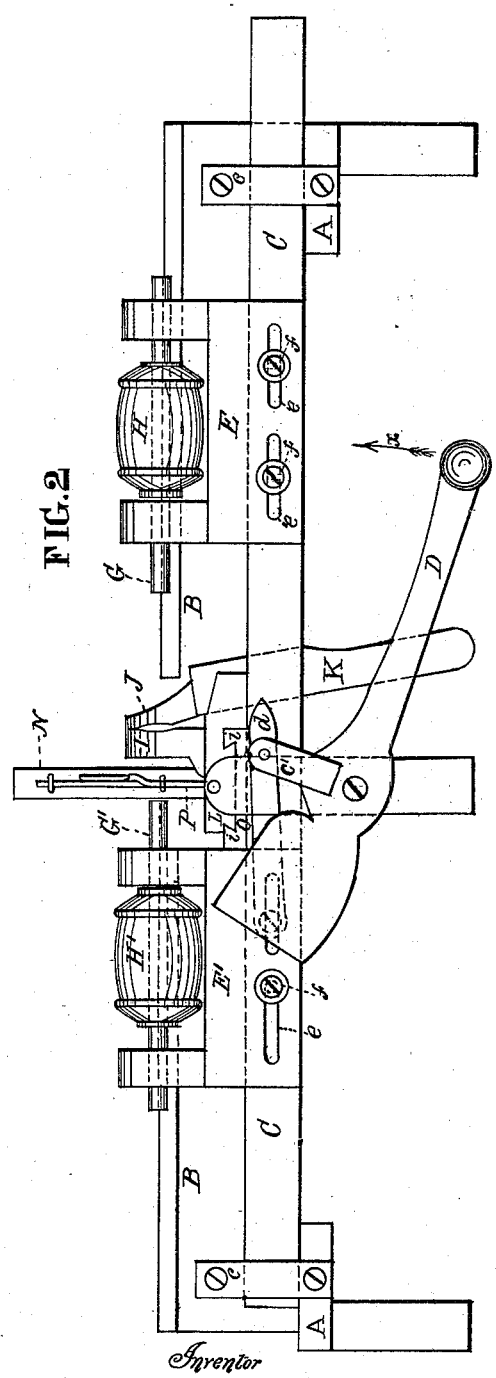
Witnesses
Thomas J. Bewley.
Chas. N. Vollum.
Inventor
Hiram A. Kimball.
per Stephen Ustick Attorney 2 Sheets—Sheet 2.
H. A. KIMBALL.
Lathe for Manufacturing Buttons.
No. 218,985. Patented Aug. 26, 1879.
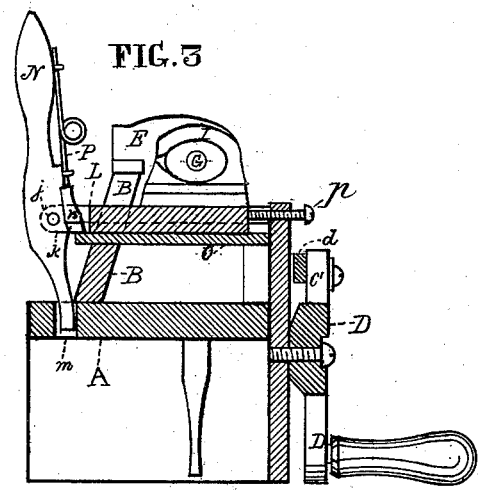
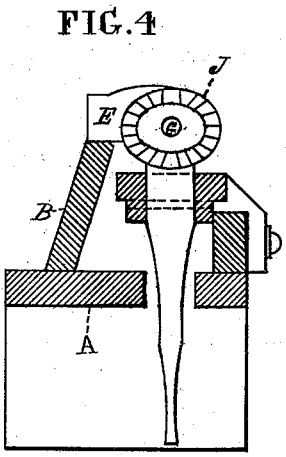
Witnesses
Thomas J. Bewley.
Chas. N. Vollum.
Inventor
Hiram A. Kimball.
per Stephen Ustick Attorney

UNITED STATES PATENT OFFICE.

HIRAM A. KIMBALL, OF PHILADELPHIA, PENNSYLVANIA, ASSIGNOR TO GAY, KIMBALL & GAY, OF GAYSVILLE, VERMONT.

IMPROVEMENT IN LATHES FOR MANUFACTURING BUTTONS.

Specification forming part of Letters Patent No. 218,985, dated August 26, 1879; application filed July 7, 1879.

*To all whom it may concern:*

Be it known that I, HIRAM A. KIMBALL, of the city and county of Philadelphia, in the State of Pennsylvania, have invented a new and useful Improvement in Lathes for the Manufacture of Buttons from Vegetable Ivory and other Materials, of which the following is a specification.

My invention, in the first place, consists in the combination of a chuck for holding the stock to be turned with a slide which has a reciprocal lateral movement in relation to two spindles, which are provided with cutters for turning the face and rear sides of the button. By alternately adjusting the position of the chuck-slide each way from the central line of the spindles, and bringing the cutter on the spindle in the front of the chuck into action after each adjustment, the face of the button is turned of elliptical form corresponding to the lateral adjustment of the chuck-slide, as hereinafter fully described.

The invention further consists in having one of the shears which supports said cutter-heads on a horizontal line, or nearly so, with the centers of the spindles, whereby to prevent wabbling of the heads in their movements.

In the accompanying drawings, which make a part of this specification, Figure 1 is a plan view of my improved lathe. Fig. 2 is a side elevation of the same. Fig. 3, Sheet No. 2, is a cross-section at the line $x\ x$ of Fig. 1. Fig. 4 is a like section at the line $y\ y$ of Fig. 1.

Like letters of reference in all the figures indicate the same parts.

A represents the bed-plate of my improved lathe. B is a stationary shear, and C a reciprocating bar, upon which the cutter-heads rest. The upper edge of the shear B is on a line, or nearly so, with the spindles of the heads, to prevent lateral wabbling of the heads in their movements. The bed-plate A and shear B are connected together at their ends by means of the end pieces, $a\ a$. The bar C is held in connection with the bed-plate, with its lower edge resting thereon, by means of the caps $c\ c$, in such a manner as to have a free longitudinal movement, which is given by means of the lever D, which has an arm, $c'$, that is jointed to one end of the connecting-rod $d$, the other end of which is pivoted to the sliding head E′, which is connected to said bar C, so that the longitudinal movement of the head effects such movement of the bar. It also gives a like movement to the head E, which is also bolted to the bar C. The heads are adjustable on the bar by means of the slots $e$ and bolts $f$, as seen in Fig. 2.

The head E has a spindle, G, adapted to hold a cutter for turning the face of the button, and the head E′ has a spindle, G′, adapted to hold a cutter for turning the rear side of the button. The spindles G and G′ are provided with pulleys H and H′, respectively, for the reception of driving-belts.

I is a face-plate, upon which the stock to be turned is held by means of the gripe J, which is permanently held in its closed position by means of the lever K. As the combination of the gripe with the face-plate is not new, a particular description is not given. The face-plate I has a permanent connection with the sliding plate L (which has dovetail-guides $i\ i$) for the reciprocating movement of the chuck, to bring it out of line with the spindles G and G′ alternately at each side of the centers of the spindles for turning an elliptical face to the button.

N is a lever, which is hung on the fulcrum-pin $j$, that is held by the cheeks $k\ k$ of the slide L. The lower end of the lever is fitted to the opening $m$ of the bed-plate A, whereby the lever has an oscillatory movement for giving the lateral movements to the slide L. The lever is provided with a friction-slide, P, that has a block, $n$, on its lower end, that is caused to press against the end of the cross-plate O, on which the slide L moves, to hold the slide in its adjusted position when the chuck is centrally arranged for the cut on the back of the button.

The operation is as follows: The slide L is adjusted by means of the lever N, so as to bring the center of the face-plate I to one side of the central line of the spindles G and G′, for turning one half of the oval on the face of the button, and the lever D is moved in the direction of the arrow $x$ far enough to bring the head E to the proper position for the cutter (not shown in the drawings) to be in contact with the stock to be turned; and when one half of the oval is turned the lever is reversed to disengage the cutter from the stock. Then, by a reverse movement of the lever N, the slide L is moved in the other direction to bring the center of the chuck to the opposite side of the spindles for turning the other half of the oval. When this is accomplished the slide L is adjusted so as to have the chuck centrally arranged with the spindles for turning the rear side of the button. The set-screw $p$ is used for the adjustment of the slide L for the turning of the oval form to the face of the button.

I claim as my invention—

1. The slide L, carrying the face-plate I or chucking device, in combination with the gripe J and lever K, substantially as and for the purpose set forth.

2. The combination of the sliding heads E and E' with the shears of a lathe, when the upper edge of one of the shears is on a line horizontally with the centers of the spindles, or nearly so, substantially as and for the purpose set forth.

HIRAM A. KIMBALL.

Witnesses:
 STEPHEN USTICK,
 L. A. KIMBALL.